United States Patent
Bonaiti et al.

(10) Patent No.: US 12,526,937 B2
(45) Date of Patent: Jan. 13, 2026

(54) CONNECTOR WITH GATE

(71) Applicant: KONG S.P.A., Monte Marenzo (IT)

(72) Inventors: Marco Bonaiti, Monte Marenzo (IT); Mattia Spada, Monte Marenzo (IT)

(73) Assignee: KONG S.P.A., Monte Marenzo (IT)

( * ) Notice: Subject to any disclaimer, the term of this patent is extended or adjusted under 35 U.S.C. 154(b) by 1084 days.

(21) Appl. No.: 17/514,876

(22) Filed: Oct. 29, 2021

(65) Prior Publication Data

US 2022/0346254 A1  Oct. 27, 2022

(30) Foreign Application Priority Data

Apr. 23, 2021  (IT) ........................ 102021000010391

(51) Int. Cl.
*H05K 5/02* (2006.01)
*F16B 45/02* (2006.01)
*G06K 19/077* (2006.01)

(52) U.S. Cl.
CPC ......... *H05K 5/0221* (2013.01); *F16B 45/027* (2021.05); *G06K 19/07758* (2013.01)

(58) Field of Classification Search
CPC ... H05K 5/0221; F16B 45/027; F16B 45/026; F16B 45/028; F16B 2200/95; F16B 45/023; F16B 45/024; F16B 45/04; F16B 45/029; F16B 45/02; G06K 19/07758; A62B 5/0075; A62B 5/0006; A62B 5/0068; A62B 5/0043; A62B 5/0087; A62B 5/0037; A62B 5/00; A62B 5/005; A62B 5/0056

See application file for complete search history.

(56) References Cited

U.S. PATENT DOCUMENTS

| | | | | |
|---|---|---|---|---|
| 5,608,953 | A  * | 3/1997 | Petzl ..................... | F16B 45/027 24/588.1 |
| 9,480,866 | B2 | 11/2016 | Pollard | |
| 2005/0115219 | A1* | 6/2005 | Hsu ...................... | F16B 45/023 59/84 |
| 2005/0246874 | A1* | 11/2005 | Hsu ...................... | F16B 45/023 24/598.2 |
| 2008/0005876 | A1* | 1/2008 | Christianson ......... | F16B 45/026 24/600.1 |
| 2011/0023275 | A1* | 2/2011 | Thompson ............ | F16B 45/023 24/600.2 |
| 2012/0317761 | A1* | 12/2012 | Tardif ................... | F16B 45/029 24/599.5 |

(Continued)

FOREIGN PATENT DOCUMENTS

EP   3 156 672 A1   4/2017

OTHER PUBLICATIONS

Italian Search Report (partially in English) dated Dec. 22, 2021 in Italian Application No. IT202100010391 (9 pages total).

*Primary Examiner* — Ko H Chan
(74) *Attorney, Agent, or Firm* — Rothwell, Figg, Ernst & Manbeck, P.C.

(57) ABSTRACT

The invention relates to a connector for works at height, rescue or mountaineering, including climbing, in which an electronic component is present on the closing screwgate, such as an integrated circuit of the radio-frequency type, usable for the identification via computer systems and in which information relating to the connector itself and its use can be written.

5 Claims, 4 Drawing Sheets

(56) References Cited

U.S. PATENT DOCUMENTS

| | | | |
|---|---|---|---|
| 2013/0036579 A1* | 2/2013 | Christianson | F16B 45/023 24/600.1 |
| 2014/0082901 A1* | 3/2014 | Yeh | F16B 45/029 24/599.1 |
| 2014/0245576 A1* | 9/2014 | Perner | F16B 45/028 24/600.1 |
| 2016/0107007 A1* | 4/2016 | Pollard | A62B 35/0075 182/3 |

* cited by examiner

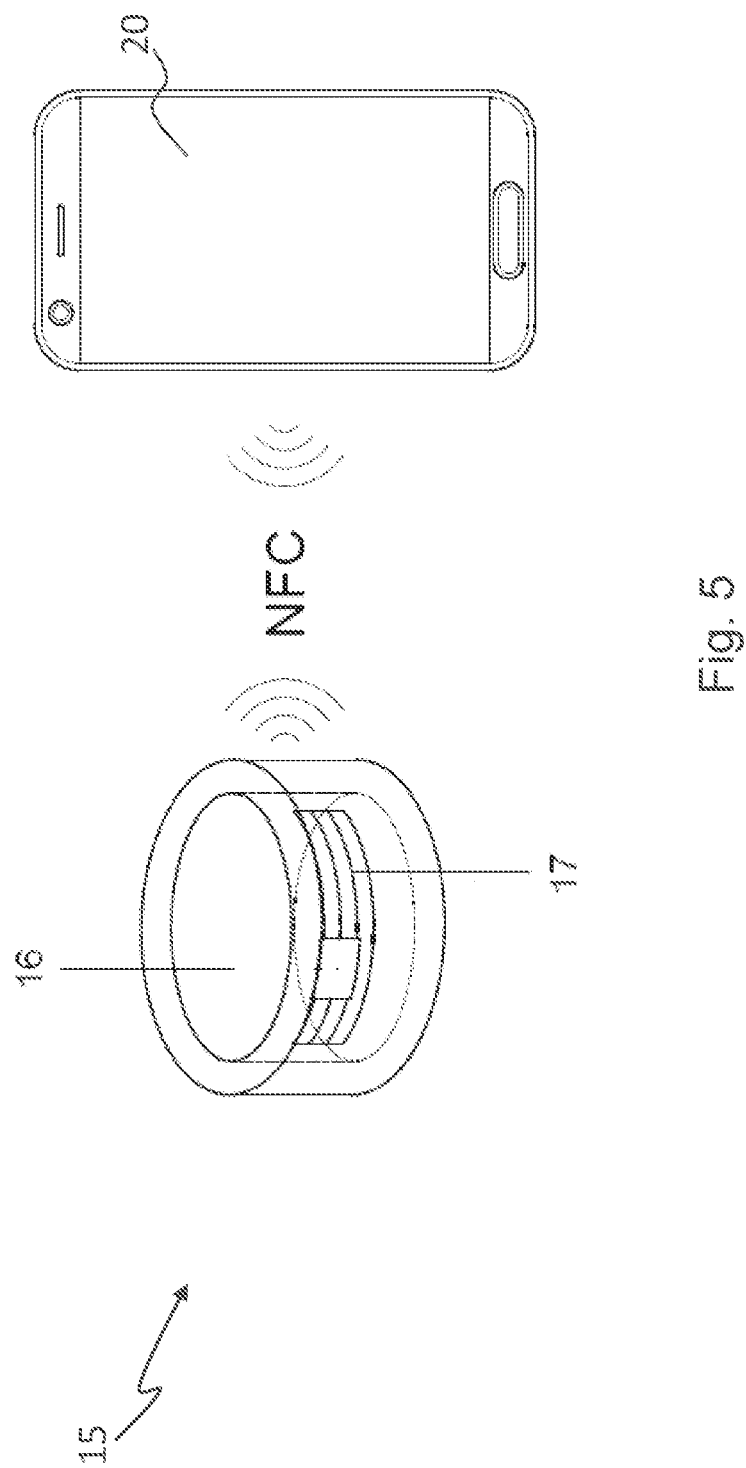

CONNECTOR WITH GATE

CROSS REFERENCE TO RELATED APPLICATION(S)

This application claims the benefit under 35 U.S.C. § 119 of Italian patent application No. 102021000010391 filed Apr. 23, 2021, the disclosure of which is incorporated herein by reference.

The present invention relates to a connector of the type intended for the assembly of fall prevention and/or protection systems for works at height for persons, such as on construction sites, in maintenance operations at height, in technical rescue, and for the assembly of fall prevention and/or protection systems in mountaineering including climbing, in leisure time, such as in amusement parks with elevated paths.

As is well known, the connector is substantially a special metal hook or ring of varying shape and size, fitted with a spring element that ensures the closure of the hook itself, which, when closed, takes on the characteristics of a ring.

Generally used for hanging, suspending or preventing bodies from falling, it is particularly useful in mountaineering, where it is indispensable for manoeuvres that are to be performed on the wall, but also in all the numerous rescue, maintenance, construction, repair, cleaning and similar operations, which are carried out at height on buildings, in various civil and industrial buildings, including by airplanes or helicopters. Think of the maintenance and the cleaning of the façades of skyscrapers, but also of the interventions on wind turbines or on remote transmission antennas, of the rescue and salvaging operations in the mountains or by firefighters.

Within these applications there is a wide variety of connectors, both in terms of shape, size and materials.

The invention applies to all of these variants, but of particular interest here are connectors having an opening locking mechanism (commonly known as a "screwgate"), the latter being a bushing that can be arranged in a non-operational position in which it allows the connector to be opened by moving its elastically oscillating lever, and in a position in which it locks the lever while keeping the connector closed (usually the normal position and used to support forces).

The screwgate can be manually operated (e.g. by screw) or automatically operated by a spring (e.g. two- or three-movement snap closure); this system serves, once closed, to prevent an accidental opening of the connector lever. This is advantageous for the normal manoeuvres envisaged by the techniques of use, such as self-belaying during a stop and when manoeuvring a person up a wall or in any case in an exposed condition.

In fact, if the connector were positioned by turning the arm with the lever in contact with a surface (of the user, of other devices, of the structures, of the rock), movements could involuntarily open the lever, generating a situation of risk or even of fall of the user. The lever locked with screwgate allows to overcome this problem.

The connectors are subject to precise technical standards regarding their mechanical properties, such as mechanical strengths, shapes and surface state, the information to be affixed, the requirements of the mechanisms.

The climbing and mountaineering connectors, as well as those for occupational and civil use, are considered as personal protective equipment and are certified according to the relevant standards; in Europe the standards are harmonised with the European regulations and directives in force (e.g. EN 362 and EN 12275), while in the rest of the world the requirements vary locally and according to technical standards of the sector (e.g. ANSI/ASSP Z359 and CSA Z259 Fall Protection Code, NFPA 1983).

The climbing and mountaineering connectors can also bear the international mark UIAA, the documentation for which is in the public domain: the latter provides for more restrictive constraints on manufacturers aimed at ensuring additional safety thanks to continuously updated information from users, associations, manufacturers, and laboratories all over the world, and not restricted to the European context.

To help recognise the qualities required of such a tiny object, following the main strengths required according to the UIAA mountaineering regulation, the minimum required breaking loads vary according to the intended use of the connector: along the longitudinal axis (i.e. in the same direction as the long side of the connector) with closed lever it can vary between 20 and 25 kN, while the longitudinal one with open lever between 5 and 7 kN, and the one in the transverse direction between 7 and 10 kN. However, there are connectors with different breaking loads, depending on the needs.

By global agreement there is therefore the need to continuously monitor the status of the connector, both during use and during storage. These aspects are also regulated by various regulations (EN 365 in Europe) which require the manufacturer to provide knowledge for the checks and the user to carry them out according to the information received.

However, this and other important information relating to the characteristics of the connectors is not readily and immediately available to users.

In fact, connectors are generally stamped with the minimum necessary information that can be received on the limited available surface (e.g. longitudinal strength, reference technical standard for their determination, traceability information, mark of conformity to the target market), but this refers to the product under new conditions and therefore after a few years of use the properties of a connector may be reduced by the use that has been made thereof.

In addition, the connectors can be interchanged or mixed up among people, so that while apparently similar, they may have different characteristics related to age, use, storage conditions, preventing the lean traceability in the supply chain required by the market regulations. It is also possible to re-use the connectors that have been sold and are destined for disposal because they do not comply with the prescribed checks.

There is therefore a general need for more comprehensive information on personal protective equipment such as the connectors that are of interest herein, in order to achieve a better level of safety and reliability than what is currently the case, also available to the users themselves, whether they are employed by large companies or private individuals.

To meet this need, one could think of stamping this information on the metal of the connectors, but this alters their strength capacity, especially if carried out hot, and it is impossible to apply all the required information legibly.

On the other hand, one could also think, as an alternative, of applying adhesive labels: however, in addition to not being reliable due to the fact that the labels can be written by anyone, they are however easily subject to damages or detachments due to shocks, scratches, water and other causes, which might make them illegible or useless. The labels can then be removed and applied to another connector and would often turn out to be larger than the connector itself.

The technical problem underlying the invention is therefore that of making available a connector, i.e., a personal safety device typically made of metal material or in any case with high strength, which can be reliably associated with information relating to its identification and/or use, so as to achieve a better level of safety than similar known safety devices.

The idea of solving this problem is to associate a radio-frequency electronic device (e.g., of the so-called NFC type, an acronym for the term Near Field Communication) with the connector, so as to allow the computerised recognition and to receive and transmit information in a secure manner via a signalling apparatus electromagnetically coupled with it.

In accordance with a preferred embodiment, the radio-frequency device is applied on the screwgate of the connector, as this allows the positioning of the connector in a less stressed area and easily accessible for short distance communications.

In addition, and even more preferentially, the radio-frequency device is arranged in a groove or recess of the connector screwgate, so that it is partially covered and protected from shocks, scratches and the like.

These and other features of the invention are set forth more specifically in the claims appended to this description.

These features, the effects resulting therefrom and the advantages achieved by the invention, will be more apparent from the description below of an example embodiment thereof, illustrated with reference to the attached figures provided by way of indication and not limitation, wherein:

FIG. 1 (b) shows a connector in accordance with the invention in an open condition;

FIG. 5 is a diagram of another detail of the previous connector.

Figure 1B:
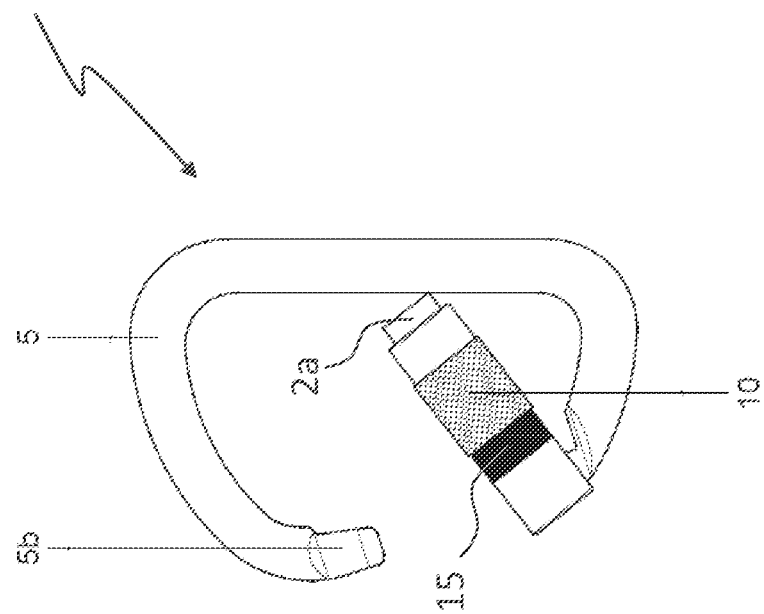
FIG. 1 (a) shows a connector in accordance with the invention in a closed condition.
Figure 1A:
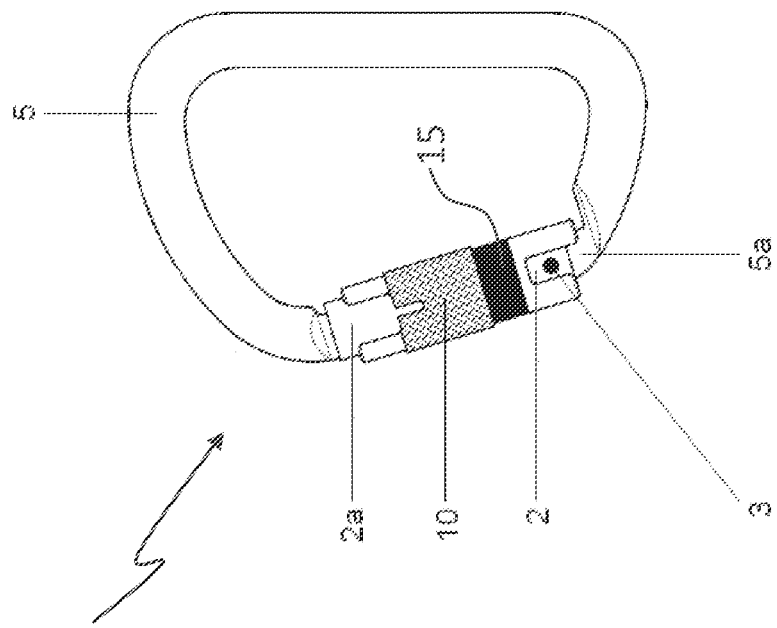

With reference to the drawings listed above, FIG. 1(a) shows a connector indicated as a whole with the reference numeral 1, in accordance with the invention.

The connector 1 has a general substantially "D"-profile but could be configured differently, for example circular, oval, oblong and anything else known in the art.

The connector comprises a lever finger 2, oscillating with respect to a fulcrum 3 located at one end 5a of the hook-shaped body 5 of the connector; the free end 2a of the oscillating finger 2 is intended to rest on the second end 5b of the hook-shaped body 5 of the connector 1, in the closed condition of the latter.

Figure 3:
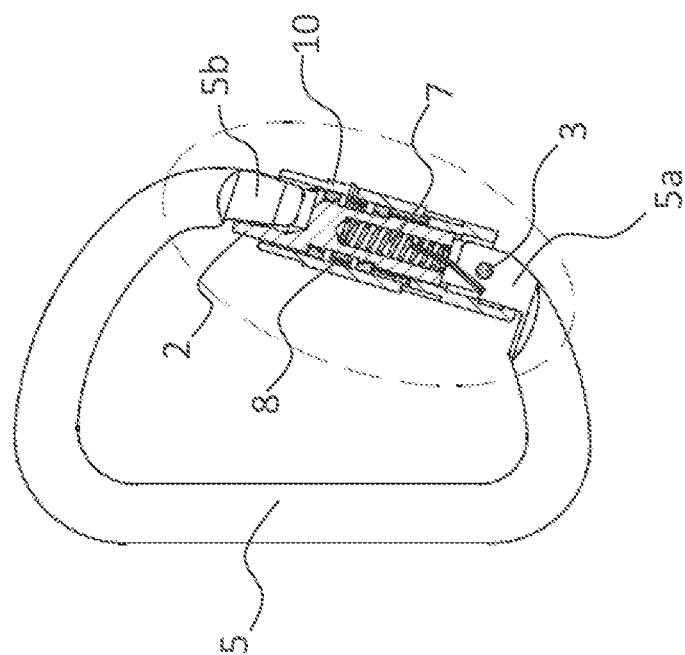
FIG. 3 is a partial sectional view of the connector screwgate in FIG. 1 (a)
Figure 2:
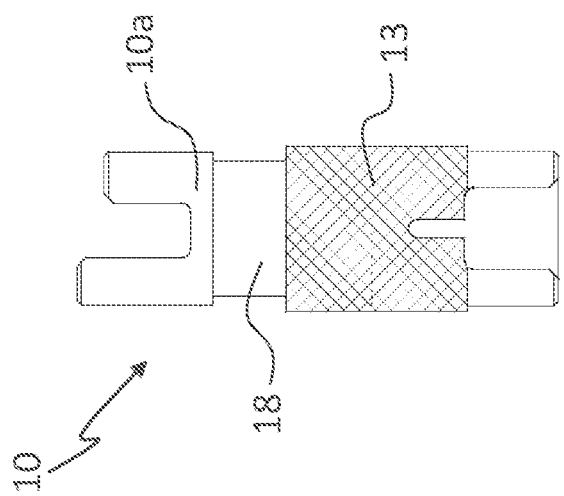
FIG. 2 shows the connector screwgate of FIGS. 1(a) and 1(b)
Figure 4:
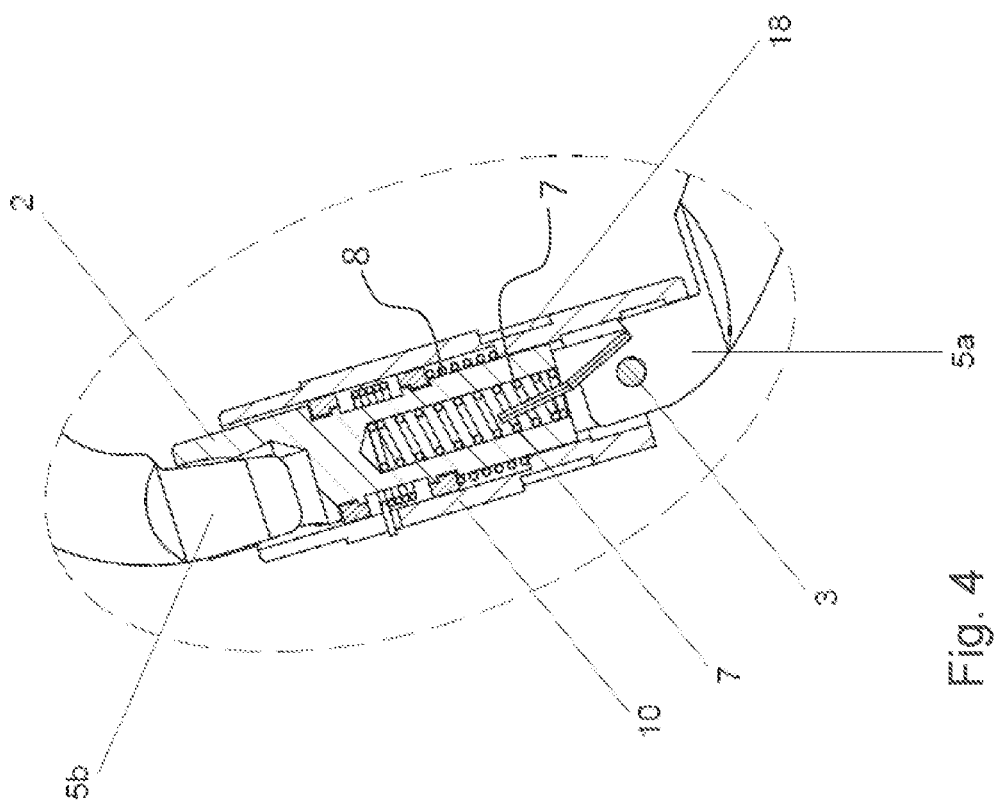
FIG. 4 is an enlarged view of a detail in FIG. 3.

The finger 2 oscillates in opposition to the elastic action of a spring 7 housed therein, which when at rest keeps the finger 2 in a closed condition (FIG. 3).

On the finger 2 there is applied a security screwgate 10 of the connector 1, which is also movable between an advanced condition for locking the finger 2 in the closed condition (FIG. 3), and a retracted position in which it allows the oscillations of the lever finger 2 (as in FIG. 1(b)).

For this purpose, the screwgate 10 and the finger 2 are mutually coupled by means of an interlock and spring mechanism 8; the screwgate 10 is also preferably provided with an external knurling 13, which facilitates its grip with the phalanges of a user's fingers. As an alternative to (or in combination with) the spring mechanism 8, the screwgate 10 and the finger 2 can be coupled by means of a thread.

In accordance with the invention, an element or tag 15 for radio-frequency proximity communications (e.g., NFC) can be applied on the screwgate 10.

As is well known, proximity communication is a receiving/transmitting technology that provides wireless, contactless connectivity between a transmitter and a receiver, via short-range radio frequencies RF) (usually up to a maximum of 10 cm). For the sake of brevity, reference is made to the extensive technical and scientific literature on the subject, citing as one of the first examples of this type of device the one described in U.S. Pat. No. 4,384,288.

The technology enables a two-way communication: when two apparatuses, circuits or devices (also called initiator and target) are brought closer within a few centimetres (typically 4 cm), a peer-to-peer network is created between the two apparatuses and both can send and receive information.

The technology usually operates at a frequency of 13.56 MHz and can reach a maximum data rate of 424 kbits/s.

NFC can be implemented directly via an integrated circuit (chip), or via a special external card that is connected to the initiator device.

Preferably, in the connector 1 the tag 15 is configured in the form of a ring 16 made of polymeric (e.g. polypropylene, ABS, polyethylene) or elastomeric material (e.g. silicone, polyurethane, rubber) or comprising an elastomeric matrix, so as to be resistant to external agents (water, dust, humidity, electrostaticity, etc.) and suitable for absorbing shocks or various stresses, protecting the electronic circuit(s) 17 embedded therein.

According to a preferred embodiment, the ring 16 has a thickness such that it is flush with the outer one of the adjacent parts of the screwgate 10, such as the knurling 13 and the tang 10a.

For this purpose, in the screwgate 10 there is an annular groove 18 having a depth substantially equal to the radial thickness of the ring 16, so that the latter can be housed inside the groove 18.

From the foregoing, it is possible to understand how the connector 1 solves the technical problem underlying the invention outlined above.

In fact, the presence of the tag 15 allows information to be exchanged with the electronic circuit 17 inside it; this information may be of various kinds, for example a unique code of the tag, a number, batch and/or date of manufacture, the owner of the connector 1, or even the number of times and/or the time of use and so on.

As already explained, in fact, the radio-frequency devices are capable of two-way communication with appropriate transceivers, today also consisting of mobile phones 20, as schematically shown in FIG. 5.

The data contained in the electronic circuit 17 of the tag 15 can therefore be read whenever desired, with a normal computer reader or even a portable device 20.

The data can also be updated in the same way, i.e., via a transceiving apparatus, exploiting the two-way characteristic of the proximity communication.

Obviously, these functions can be increased and can be integrated with other solutions.

For example, one might think of including among the data in the tag 15 also those for linking to an Internet page or website or database, in order to expand the content and the amount of information that can be consulted.

In this case, when the tag 15 on the connector is read with a mobile phone, the opening of a document or of an application on the Internet network is activated where the information can be consulted.

It should also be pointed out that the positioning of the tag 15 on the screwgate 10 allows to limit the stresses to which it is subjected, since in the use of the connector the screwgate 10, being arranged on the closing finger 2, is not particularly stressed by the ropes, pulleys, descenders, harnesses or other tools, which are used with the connector to secure people in working or mountaineering manoeuvres.

Any stresses on the connector 1 caused by shocks, falls and the like are in no case transmitted to the ring 16 arranged on the screwgate 10 and nor to the finger 2 or the body 5 of the connector.

On the basis of these teachings, the persons skilled in the art will be able to develop or implement further functions and characteristics of the connector according to the invention.

For example, the use of RFID tags or other solutions equivalent to the proximity communication technology is believed to fall within the scope of this teaching.

The characteristics of the invention and of its variants nevertheless fall within the scope of the following claims.

The invention claimed is:

1. A connector comprising:
   a hook-shaped body;
   a finger connected to the hook-shaped body and oscillating between a closed condition, in which the finger is engaged with one end of the body, and an open condition, in which the finger is separate from the one end of the body; and
   a screwgate coupled with the finger for locking the finger in the closed condition, wherein the screwgate comprises a proximity communication element or tag associated with the screwgate and/or with the finger, wherein the screwgate includes an annular groove formed inside or outside the screwgate, the proximity communication element or tag is configured as a ring, and the ring is housed in the annular groove, and wherein the annular groove has a depth substantially equal to a radial thickness of the ring.

2. The connector of claim 1, wherein the proximity communication element or tag is of a radio-frequency type.

3. The connector of claim 1, wherein the proximity communication element or tag employs near field communication.

4. The connector of claim 1, wherein the proximity communication element or tag comprises an electronic circuit integrated into or associated with a polymeric or elastomeric layer.

5. The connector of claim 1, wherein the ring housed in the annular groove is flush with an outer one of adjacent parts of the screwgate.

* * * * *